United States Patent
Schulze

(10) Patent No.: US 7,254,994 B2
(45) Date of Patent: Aug. 14, 2007

(54) DEVICE FOR DETECTING AND SIGNALING A PHYSICAL VALUE WHEN CONNECTED TO A RIM, AND RIM COMPRISING SUCH A DEVICE

(76) Inventor: Gunther Lothar Schulze, Lutherstrasse 3, 75228 Ispringen (DE)

( * ) Notice: Subject to any disclaimer, the term of this patent is extended or adjusted under 35 U.S.C. 154(b) by 0 days.

(21) Appl. No.: 10/818,551

(22) Filed: Apr. 5, 2004

(65) Prior Publication Data
US 2004/0261510 A1    Dec. 30, 2004

(30) Foreign Application Priority Data
Apr. 4, 2003    (DE) ................ 103 16 705

(51) Int. Cl.
    *G01M 17/02*    (2006.01)
(52) U.S. Cl. ........................ 73/146; 73/146.5
(58) Field of Classification Search ............ 73/146, 73/146.5; 340/443, 442, 445
See application file for complete search history.

(56) References Cited

U.S. PATENT DOCUMENTS

| 3,422,415 A | 1/1969 | Ichimori |
| 5,801,340 A | 9/1998 | Peter |
| 6,778,075 B2 * | 8/2004 | Headley et al. ............ 340/443 |
| 2004/0233050 A1 * | 11/2004 | Burghardt ................... 340/445 |
| 2005/0011257 A1 * | 1/2005 | Modawell et al. ............ 73/146 |

FOREIGN PATENT DOCUMENTS

DE    199951274    8/2001

* cited by examiner

*Primary Examiner*—Andre J. Allen

(57) ABSTRACT

The invention is a device comprising a device for detecting and signaling a physical value when connected to a rim (1) in a position below a pneumatic tire mounted on the rim (1), and further comprising a device to discover a detachment of the device from the rim. The invention provides that the device to discover a detachment comprises a proximity sensor responsive to the rim (1).

11 Claims, 2 Drawing Sheets

Fig. 3
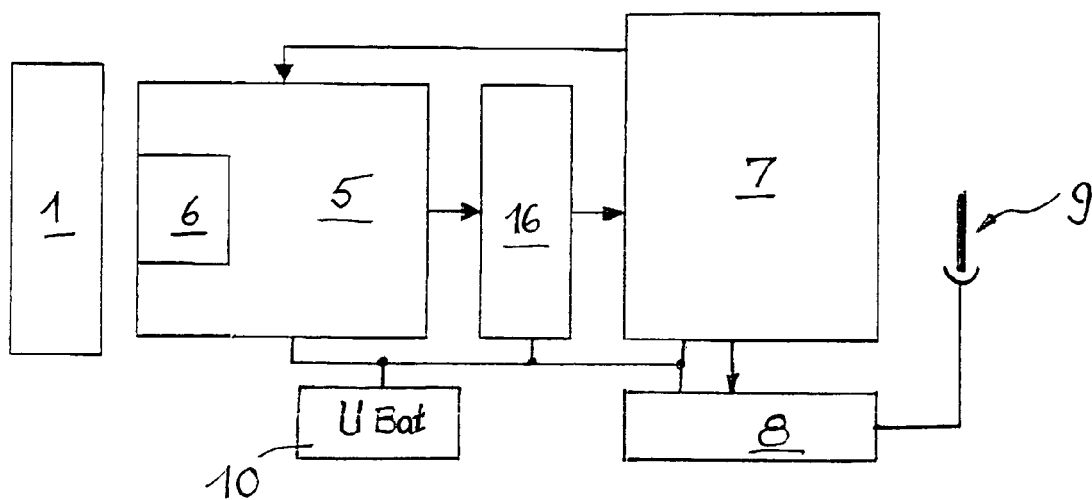
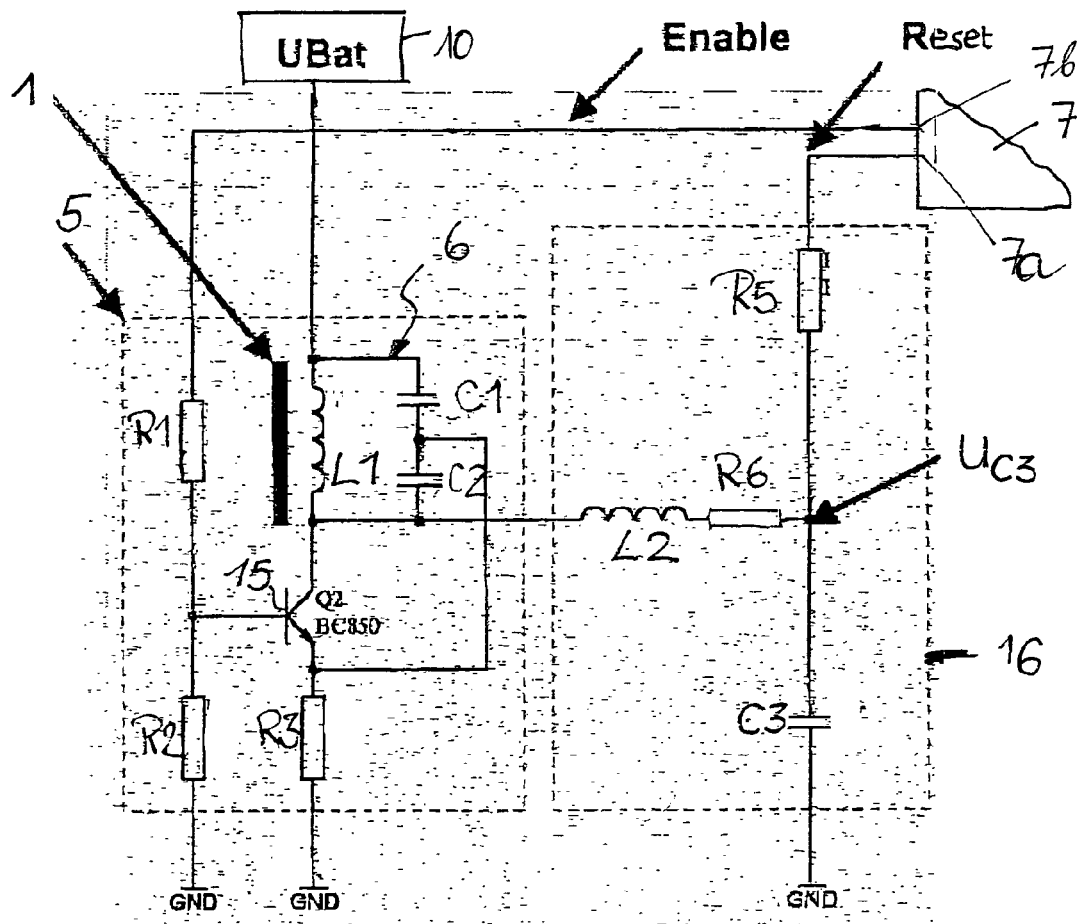
Fig. 4

DEVICE FOR DETECTING AND SIGNALING A PHYSICAL VALUE WHEN CONNECTED TO A RIM, AND RIM COMPRISING SUCH A DEVICE

Applicant claims priority of Application number 103 16 705.6 filed on 4 Apr. 2003 filed with the German Patent and Trademark Office.

BACKGROUND OF THE INVENTION

1. Field of the Invention

The invention relates to a device for detecting signaling a physical value of a rim.

2. Description of Related Art

A device of that kind has been known from WO 03/011617 A1. The device described in that publication especially serves for determining and signaling an acceleration encountered at the device, the air pressure and/or the temperature prevailing in a pneumatic tire mounted on the rim. Such a device, which will be described hereafter also as wheel sensor, usually determines the air pressure, acceleration values and/or the temperature at predetermined time intervals, and transmits them at predetermined time intervals equal or greater than the time intervals between the measurements, or else immediately when given threshold values are exceeded, to a receiver and evaluation unit in a vehicle equipped with wheels that are provided with such a wheel sensor. The wheel sensor being covered by the pneumatic tire, it is not visible from the outside. It is not possible to check visually if the sensor is still fastened correctly or if it has got detached from the rim in the course of time. Although it is practically excluded for the wheel sensor to come off the tire, having been screwed to the tire valve in the known manner, screwing a wheel sensor to the tire valve presents a disadvantage insofar as a tire valve of special design is needed, which is more expensive than a conventional tire valve, and in addition a special screw with a through bore is needed, which is more expensive as well. It has, therefore, been considered to fasten wheel sensors on the rim in some different way, for example by means of an adhesive. If a suitable adhesive is selected, and if certain marginal conditions are met, for example if sufficiently large bonding surfaces are selected and carefully prepared for the bonding process, a bonding connection may be sufficiently reliable and durable under driving conditions. Still, it makes sense to consider means and ways of knowing when a wheel sensor should get detached from the rim for one reason or other. If that should happen, the sensor would be flung against the tire inside, by the centrifugal force produced by the driving motion, and would stay there as long as the vehicle continues to move rapidly, or if it reduces its speed, would roll about in an uncontrolled fashion inside the tire, which could damage or destroy the wheel sensor and/or the tire if this condition should persist for some time.

WO 03/011616 A1 therefore suggests to investigate at regular intervals the physical values anyway measured by the wheel sensor, namely the acceleration values encountered at the wheel sensor and/or the temperature, in order to determine if the values so measured contain some information suggesting that the wheel sensor may have got detached from the rim. WO 03/011617 A1 suggests to observe the temperature because that value is clearly position-dependent. WO 03/011617 proposes to observe the acceleration occurring at the wheel sensor because that value may vary atypically when the wheel sensor gets detached from the rim. This proposal is, however, connected with the disadvantage that temperature and acceleration variations occur not only when the wheel sensor gets detached from the rim, but also as a function of the driving style, the road conditions and the moving state of the vehicle, even with the wheel sensor firmly held in place. If the wheel sensor comes off the rim shortly after the vehicle has started to move, it will not be possible to detect that condition by temperature measurements. If accelerating signals are observed, it may be difficult to differentiate between atypical acceleration and acceleration changes occurring in the normal course of driving. Further, when the vehicle is moving at rapid speed, it may be difficult to recognize as atypical a stable acceleration signal provided by a wheel sensor which has got detached from the rim and which at that time is retained on the tire inside by centrifugal force. The proposals known from WO 03/011617, therefore, may lead on the one hand to a false alarm and, on the other hand, to a wheel sensor which may have got detached from the rim being detected not early enough to prevent damage.

SUMMARY OF THE PRESENT INVENTION

Now, it is the object of the present invention to open up a way of detecting a wheel sensor that may have got detached from the rim more reliably and at as little expense as possible.

This object is achieved by the inventive device and rim. Advantageous further developments of the invention are also the subject-matter of the application.

A device according to the invention—hereinafter also described as wheel sensor—comprises a proximity sensor which is responsive to the rim. This provides considerable advantages.

- A proximity sensor is capable of distinguishing clearly between a wheel sensor connected with the rim and one that has got detached from the rim.
- Temperature, driving style and acceleration encountered at the wheel sensor do not impair the unambiguity of the output signal supplied by the proximity sensor.
- A proximity sensor can be integrated into a conventional wheel sensor as an additional element without any difficulty.
- The electric output signal of the proximity sensor can be transmitted by radio, together with the other values of physical variables such as air pressure, temperature and centrifugal acceleration or path acceleration, to a receiver and evaluation unit provided in the vehicle using signaling means (radio transmitter) anyway provided as part of the wheel sensor.
- Components anyway provided in the wheel sensor, such as battery, radio transmitter, antenna, circuit board, integrated circuit (microprocessor or ASIC) can be used for the construction and operation of the proximity sensor so that little input is required only for its realization.

While, basically, there is the possibility to use a proximity sensor which directly contacts the rim in a given mounting position of the wheel sensor, a proximity sensor that responds to the rim in non-contact fashion provides a more reliable and cheaper solution.

Preferably, the proximity sensor is not operated continuously; instead, there is provided a timing circuit for activating the proximity sensor at predetermined time intervals, because in this case current consumption is limited and, if the current supply is provided by a battery, long service life can be achieved without battery change. According to an especially preferred solution, the proximity sensor is activated simultaneously with one of the other sensors comprised in the device, especially simultaneously with a pressure sensor intended to measure air pressure in the tire. This guarantees that not only the tire pressure but also the position of the wheel sensor is checked at the time intervals that have been set in advance as a function of the particular safety requirements. In addition, the air pressure, temperature, acceleration values so determined and the signal of the proximity sensor can then be transmitted in current-saving fashion by a common data telegram.

Suited as proximity sensors for the purposes of the invention are, above all, capacitive and inductive sensors. A capacitive proximity sensor can be formed by designing and arranging a first capacitor electrode in the wheel sensor in such a way that in the predetermined mounting position of the wheel sensor it will come to lie closely opposite the rim surface so that the rim acts as a second capacitor electrode which, together with the first capacitor electrode, forms a capacitor whose capacitance would vary strongly if the wheel sensor should drop off the rim. An especially favorable solution is obtained if the proximity sensor comprises two capacitors each of them having a first electrode in the wheel sensor and both of them using the rim as a common coupling electrode. This embodiment provides the advantage that well-defined electric potentials are encountered on the electrodes of the proximity sensor capacitors even without any direct electric connection between the wheel sensor and the rim.

If the proximity sensor is an inductive sensor, then it is convenient to provide an inductor, for example an electric coil, in the wheel sensor in an arrangement such that the predetermined mounting position of the wheel sensor is located especially close to the rim surface. This has the effect that, with the wheel sensor in its predetermined mounting position, the inductive resistance of the coil is clearly higher than in cases where the wheel sensor has got detached from the rim and is more remote from the rim base.

According to an especially preferred embodiment of the invention, the proximity sensor comprises an electric oscillating circuit responsive to the rim. Such an oscillating circuit can be designed and used with advantage in different ways, by arranging either one or more capacitors provided in the oscillating circuit or one or more coils provided in the oscillating circuit, or both, in the wheel sensor in such a way that they come to lie especially close to the rim surface in the predetermined mounting position of the wheel sensor so that the rim surface has a clearly measurable influence on the capacitance, the inductivity or both values and, thus, on the behavior of the oscillating circuit. Compared with a wheel sensor that has got detached from the rim, the natural frequency of the oscillating circuit of a wheel sensor, which still occupies its predetermined mounting position, is shifted toward clearly lower frequencies due to the proximity of the rim to a coil, and the amplitude of the oscillations is clearly dampened or even fully suppressed. If instead of a coil a capacitor of the oscillating circuit is influenced by the proximity of the rim, then the frequency of the oscillating circuit is likewise shifted toward lower frequencies when the wheel sensor occupies its predetermined mounting position, whereas the capacitive resistance increases when the wheel sensor has got detached from the rim.

In order to detect any change in the behavior of the oscillating circuit, there is conveniently provided a detector circuit, for example one which supplies a voltage signal the value of which provides a measure of the oscillating amplitude, its damping, frequency or frequency variation, depending on the particular design and arrangement of the oscillating circuit. Another possibility consists in checking if a response signal is provided and, if so, with which delay it is provided, after short-time excitation of the oscillating circuit.

Known wheel sensors comprise a microprocessor or ASIC. The system clock pulse of the latter can be used with advantage for monitoring the frequency of the oscillating circuit because any frequency measurement can be referred back to a time measurement. So, no additional apparatus input for frequency measurement is required in this case. There is, however, also the possibility to use a detector circuit comprising a low-pass filter, a high-pass filter or a band-pass filter whose cut-off frequencies are selected so that differentiation is possible between the two states "wheel sensor position O.K." and "wheel sensor detached" due to the fact that an oscillation excited in the oscillating circuit is permitted to pass in one of the two conditions whereas it is not in the other one of the two conditions.

An advantageous possibility to detect relevant variations in the behavior of the oscillating circuit consists in providing an additional capacitor fed by the oscillating circuit, and further to provide a threshold-value detector that monitors the charging condition of such additional capacitor, the threshold-value detector being intended to provide a signal when the charging condition of the capacitor exceeds a given threshold value. When the oscillating circuit is heavily dampened by the proximity of the rim, it may present a low-ohmic charging path for the additional capacitor so that the latter may cause the threshold-value detector to respond. However, when the wheel sensor gets detached from the rim, the oscillating circuit becomes a high-ohmic charging path for the additional capacitor so that the latter can no longer be charged up to the predetermined threshold value. In order to obtain clear results, it is necessary in this case that the additional capacitor be reset before every measuring process.

BRIEF DESCRIPTION OF THE DRAWINGS

Certain embodiments of the invention are illustrated in the attached diagrammatic drawings in which:

FIG. 3 shows a block diagram of a device according to the invention in combination with a rim; and FIG. 4 shows an example of a circuit of a device according to the invention.

DETAILED DESCRIPTION OF THE INVENTION

Figure 1:
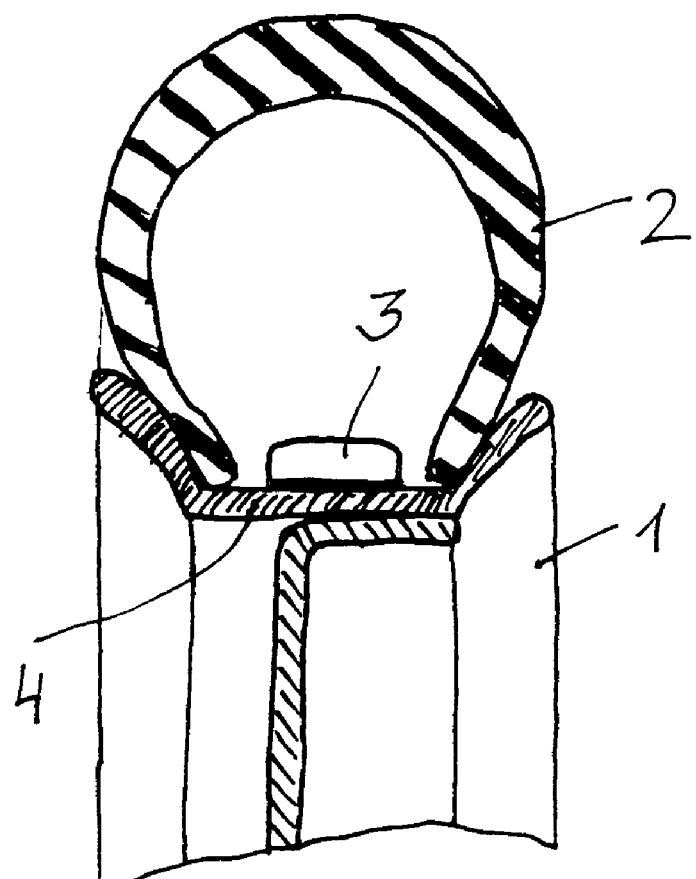
FIG. 1 shows a radial section through a vehicle wheel with pneumatic tires, having a rim and a wheel sensor connected with the rim base.

FIG. 1 shows a wheel having a rim 1 made from metal, especially from steel or aluminium. A pneumatic tire 2 is mounted on the rim 1. A wheel sensor 3, arranged below the pneumatic tire 2, is mounted on the rim base 4, for example by bonding. The wheel sensor 3 mainly serves for monitoring air pressure in the tire 2 and comprises for this purpose a pressure sensor, preferably also a temperature sensor and an acceleration sensor, further a control circuit equipped with a microprocessor or an ASIC, and means for signaling the values so measured by means of a radio transmitter and an antenna. The measured values obtained are digitally encoded, supplemented by an identification code defining the particular wheel sensor 3, and are transmitted by radio via a data bus to a receiver and evaluation unit arranged in the vehicle. The energy for the wheel sensor 3 is conveniently supplied by a battery 10—see FIGS. 3 and 4—but could be injected as well from the outside, by a sampling transmitter (transponder).

Figure 2:
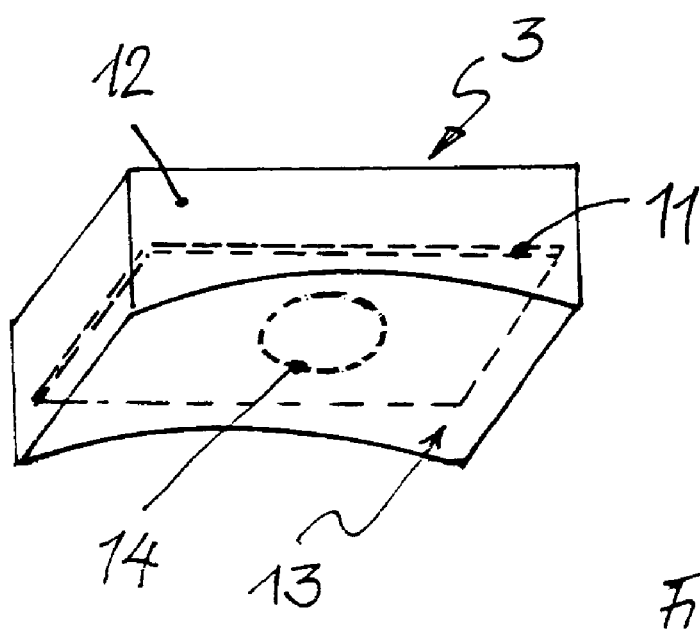
FIG. 2 shows an oblique view of the housing of a device according to the invention, illustrating the position of a circuit board.

A detail showing the components of such a wheel sensor, including the essential components of the device according to the invention, is illustrated in the block diagram of FIG. 2. In detail, the wheel sensor comprises an oscillator 5 and, as part of the oscillator, an oscillating circuit 6 which, in the predetermined mounting position of the wheel sensor 3 illustrated in FIG. 1, is located directly adjacent the rim 1, which latter influences the oscillating circuit 6 and is, therefore, likewise illustrated as a block in FIG. 2. For monitoring the behavior of the oscillator 5, there is provided a detector circuit 16 which has its input connected to the output of the oscillator 5. In addition, the wheel sensor 3 comprises an integrated circuit 7, especially an ASIC or microprocessor. The output signal of the detector circuit 16 is supplied to one of the inputs of the integrated circuit 7 and is analyzed and evaluated in the integrated circuit 7 according to predetermined criteria in order to determine if the detector output signal indicates that the wheel sensor 3 occupies its predetermined position at the rim 1 or if it has got detached from the rim 1. The integrated circuit 7 further controls a radio transmitter 8 with an antenna 9 so that it transmits the result of the evaluation of the detector output signal to the receiver and evaluation unit arranged in the vehicle. If the detector output signal indicates that the wheel sensor 3 has got detached from the rim 1, radio transmitter 8 is immediately activated and caused to transmit that message to the receiver and evaluation unit. Otherwise, it will be sufficient to transmit an O.K. signal to the receiver and evaluation unit occasionally in order to inform the unit that the device according to the invention for monitoring the position of the wheel sensor on the rim 1 is still working.

The integrated circuit 7 further monitors the other existing wheel sensors 3, for example, the sensors for pressure, temperature, acceleration and, if necessary, for other physical values, evaluates the values obtained, if necessary, and causes them to be transmitted to the central receiver and evaluation unit provided in the vehicle.

A battery 10 is provided for supplying the components of the wheel sensor with current.

The integrated circuit 7 determines a clock frequency at which the oscillator is excited momentarily. Whether or not an oscillation is then encountered, and the frequency, amplitude and damping of such oscillation, then depend on the particular location of the oscillating circuit 6, i.e. whether or not it occupies a position, in its predetermined mounting position, near the rim 1 within its range of influence. This is to be detected by a detector circuit 16 whose output signal is evaluated by the integrated circuit 7. In order to ensure that in the predetermined mounting position of the wheel sensor 3, as illustrated for example in FIG. 1, the influence of the rim 1 on the oscillating circuit 6 is as great as possible, the oscillating circuit 6 or at least one of its components having a decisive influence on its behavior (a capacitance or inductance) should be arranged as close to the rim surface 1 as possible. This can be achieved by providing the frequency-determining components on the bottom surface of a circuit board 11, which latter is mounted in the housing 12 of the wheel sensor 3 as close as possible to the bottom surface 13 of the housing and which may exhibit a corresponding concave curvature matching the curvature of the rim base 4. The zone 14 on the circuit board 11, which includes the frequency-determining component of the circuit 6, which is to be influenced by the rim 1, should be arranged most conveniently at that point where the smallest distance exists between the circuit board 11 and the bottom surface 13 of the housing, as illustrated in FIG. 3.

FIG. 4 shows part of an embodiment of the circuit illustrated in FIG. 2, but in greater detail. The oscillator 5 is designed as a Colpitts oscillator. This is a transistor oscillator with an emitter oscillating circuit which distinguishes itself by a particularly simple structure. It comprises an oscillating circuit 6 with an inductivity L1 and two capacitors C1 and C2 fed via a transistor 15 connected as common emitter. The base of the transistor 15 is driven by the integrated circuit 7 via a voltage divider comprising the resistors R1 and R2. A resistor R3 is connected between the emitter of the transistor 15 and ground. The inductivity of the coil L1 is influenced by the rim 1 located near the coil. The output of the oscillator 5 is connected to the input of the detector circuit 16. The output signal of the oscillator 5 feeds, via a coil L2 and a resistor R6, a capacitor C3 whose voltage is sampled between R6 and C3 and supplied, via a resistor R5, to a connection 7a of the integrated circuit 7 where a switching operating can be triggered by the voltage when it reaches a predetermined value. With the wheel sensor 3 in its predetermined mounting position, the oscillating circuit is 6 substantially dampened by the rim 1 so that it will oscillate either not at all or at a relatively low frequency when excited by the integrated circuit 7 via its connection 7b. In this condition, it can then present a low-ohmic charging path for the capacitor C3 so that the latter can reach a predetermined threshold and trigger a switching operation in the integrated circuit 7. On the other hand, if the wheel sensor 3 has got detached from the rim 1, the oscillating circuit 6 becomes a high-ohmic charging path for the capacitor 3 so that the latter will not reach the predetermined voltage that would trigger a switching operation in the integrated circuit 7. In this case, the integrated circuit 7 activates the radio transmitter 8 and causes it to emit a warning signal. Simultaneously with the excitation of the oscillating circuit 6 the integrated circuit 7 emits, via its connection 7a, a reset signal which discharges the capacitor C3 thereby preparing it for a new charging cycle via the oscillator 5.

The invention claimed is:

1. A device comprising means for detecting and signaling a physical value when connected to a rim in a position below a pneumatic tire mounted on the rim, further comprising means to discover a detachment of the device from the rim,
the means to discover detachment comprises a proximity sensor responsive to the rim, the means for detecting and signaling a physical value is a sensor for detecting air pressure, the proximity sensor comprises an electric oscillating circuit responsive to the rim,
wherein the oscillating circuit comprises a coil arranged in such a way that it directly neighbors the rim in a predetermined mounting position of the device on the rim.

2. A device comprising means for detecting and signaling a physical value when connected to a rim in a position below a pneumatic tire mounted on the rim, further comprising means to discover a detachment of the device from the rim,
the means to discover detachment comprises a proximity sensor responsive to the rim, wherein the means for detecting and signaling a physical value is a sensor for detecting air pressure, the proximity sensor comprises an electric oscillating circuit responsive to the rim, wherein the oscillating circuit comprises a metal layer on a circuit board, which layer is arranged in such a way that it directly neighbors the rim and is supplemented by the rim to form a capacitor in a predetermined mounting position of the device on the rim.

3. The device as defined in claim 2, wherein the oscillating circuit is connected to a detector circuit.

4. The device as defined in claim 3, wherein the detector circuit is a frequency-measuring circuit.

5. The device as defined in claim 3, wherein the detector circuit comprises a low-pass filter or a band-pass filter.

6. The device as defined in claim 3, wherein the detector circuit comprises a capacitor, fed by the oscillating circuit, and a threshold-value detector that monitors the charge of the capacitor.

7. The device as defined in claim 2, wherein the proximity sensor has an output which is connected to the input of a radio transmitter.

8. A device comprising means for detecting and signaling a physical value when connected to a rim in a position below a pneumatic tire mounted on the rim, further comprising means to discover a detachment of the device from the rim,
the means to discover detachment comprises a proximity sensor responsive to the rim, wherein the means for detecting and signaling a physical value is a sensor for detecting air pressure, the proximity sensor comprises an electric oscillating circuit responsive to the rim,
wherein the oscillating circuit comprises two metal layers arranged one beside the other on a circuit board which is arranged in such a manner that it directly neighbors the rim in a predetermined mounting position of the device on the rim acting as a coupling electrode, so as to supplement the rim to form with the rim two capacitors.

9. A device comprising means for detecting and signaling a physical value when connected to a rim in a position below a pneumatic tire mounted on the rim,
and further comprising means to discover a detachment of the device from the rim,
the means to discover detachment comprises a proximity sensor responsive to the rim,
wherein the proximity sensor comprises an electric oscillating circuit responsive to the rim and the oscillating circuit comprises a coil arranged in such a way that it directly neighbors the rim in a predetermined mounting position of the device on the rim.

10. A device comprising means for detecting and signaling a physical value when connected to a rim in a position below a pneumatic tire mounted on the rim,
and further comprising means to discover a detachment of the device from the rim,
the means to discover detachment comprises a proximity sensor responsive to the rim,
wherein the proximity sensor comprises an electric oscillating circuit responsive to the rim and the oscillating circuit comprises a metal layer on a circuit board, which layer is arranged in such a way that it directly neighbors the rim and is supplemented by the rim to form a capacitor in a predetermined mounting position of the device on the rim.

11. A device comprising means for detecting and signaling a physical value when connected to a rim in a position below a pneumatic tire mounted on the rim,
and further comprising means to discover a detachment of the device from the rim,
the means to discover detachment comprises a proximity sensor responsive to the rim,
wherein the proximity sensor comprises an electric oscillating circuit responsive to the rim and the oscillating circuit comprises two metal layers arranged one beside the other on a circuit board which is arranged in such a manner that it directly neighbors the rim in a predetermined mounting position of the device on the rim acting as a coupling electrode, so as to supplement the rim to form with the rim two capacitors.

* * * * *